United States Patent
Erol et al.

(10) Patent No.: US 12,394,037 B2
(45) Date of Patent: Aug. 19, 2025

(54) PHYSICS-INFORMED ANOMALY DETECTION IN FORMED METAL PARTS

(71) Applicant: Siemens Aktiengesellschaft, Munich (DE)

(72) Inventors: Baris Erol, Rochester Hills, MI (US); Jason Dube, Windsor (CA); Yuan Zi, Houston, TX (US)

(73) Assignee: Siemens Aktiengesellschaft, Munich (DE)

( * ) Notice: Subject to any disclaimer, the term of this patent is extended or adjusted under 35 U.S.C. 154(b) by 436 days.

(21) Appl. No.: 18/149,686

(22) Filed: Jan. 4, 2023

(65) Prior Publication Data
US 2023/0230224 A1 Jul. 20, 2023

(30) Foreign Application Priority Data
Jan. 14, 2022 (EP) .................................... 22151483

(51) Int. Cl.
*G06T 7/00* (2017.01)
*G06T 7/33* (2017.01)
(Continued)

(52) U.S. Cl.
CPC ............ *G06T 7/0008* (2013.01); *G06T 7/001* (2013.01); *G06T 7/337* (2017.01); *G06V 10/25* (2022.01);
(Continued)

(58) Field of Classification Search
None
See application file for complete search history.

(56) References Cited

U.S. PATENT DOCUMENTS

2008/0004850 A1* 1/2008 Wang .................... G06F 30/23
703/13
2018/0276810 A1* 9/2018 Wang ................. G01M 5/0033
(Continued)

FOREIGN PATENT DOCUMENTS

| CN | 113610794 A | 11/2021 |
|----|-------------|---------|
| WO | 2021137745 A1 | 7/2021 |

OTHER PUBLICATIONS

Mei, S., Yang, H., & Yin, Z. (2018). An Unsupervised-Learning-Based Approach for Automated Defect Inspection on Textured Surfaces. IEEE Transactions on Instrumentation and Measurement, 67(6), 1266-1277.*

(Continued)

*Primary Examiner* — Andrew W Bee
*Assistant Examiner* — Christine Zhao

(57) ABSTRACT

A method for detecting defects in a formed metal part includes locating one or more regions of interest in a synthetic image of a part manufactured by a forming process. The synthetic image is informed based on a physics-based simulation of the forming process. The regions of interest indicate a high risk of having a defect from the forming process. A set of training images including real images of actual manufactured parts are registered with the synthetic image. The regions of interest are overlaid on each training image, to extract patches from the training images that correspond to high-risk regions. An anomaly detection model is trained on the patches extracted from the training images to detect a defect in a formed metal part from an acquired image of the formed metal part, by detecting an anomaly in a patch extracted from the acquired image that corresponds to a high-risk region.

15 Claims, 8 Drawing Sheets

(51) Int. Cl.
  *G06V 10/25* (2022.01)
  *G06V 10/74* (2022.01)
(52) U.S. Cl.
  CPC .. *G06V 10/761* (2022.01); *G06T 2207/10024* (2013.01); *G06T 2207/20081* (2013.01); *G06T 2207/30136* (2013.01); *G06V 2201/07* (2022.01)

(56) References Cited

U.S. PATENT DOCUMENTS

2018/0335296 A1  11/2018  Golovashchenko
2020/0160083 A1  5/2020  Zhu et al.

OTHER PUBLICATIONS

Thomas Schlegl, Philipp Seeböck, Sebastian M. Waldstein, Ursula Schmidt-Erfurth, & Georg Langs. (2017). Unsupervised Anomaly Detection with Generative Adversarial Networks to Guide Marker Discovery.*

Cai, N., Cen, G., Wu, J., Li, F., Wang, H., & Chen, X. (2018). SMT Solder Joint Inspection via a Novel Cascaded Convolutional Neural Network. IEEE Transactions on Components, Packaging and Manufacturing Technology, 8(4), 670-677.*

Ferguson, M. K., Ronay, A., Lee, Y. T., Law, K. H. (2018). Detection and Segmentation of Manufacturing Defects with Convolutional Neural Networks and Transfer Learning. Smart and sustainable manufacturing systems, 2, 10. 1520/SSMS20180033. https://doi.org/10. 1520/SSMS20180033.*

Aliaksei Petsiuk, & Joshua M. Pearce. (2021). Towards Smart Monitored AM: Open Source in-Situ Layer-wise 3D Printing Image Anomaly Detection Using Histograms of Oriented Gradients and a Physics-Based Rendering Engine.*

Jens Heger, Gururaj Desai, & Mazhar Zein El Abdine (2020). Anomaly detection in formed sheet metals using convolutional autoencoders. Procedia CIRP, 93, 1281-1285.*

Heger, Jens et al: "Anomaly detection in formed sheet metals using convolutional autoencoders"; PROCEDIA CIRP;vol. 93; Jan. 1, 2020; pp. 1281-1285; XP055932705; NL; ISSN: 2212-8271; DOI: 10.1016/j.procir.2020.04.106;URL: https://www.researchgate.net/profile/Mazhar-Zein-El-Abdine/publication/344431864_Anomaly_detection_in_formed_sheet_metals_using_convolutional_autoencoders/links/5f749546a6fdcc008649118d/Anomaly-detection-in-formed-sheet-metals-using-convolutional-autoencoders.pdf>.

Ruff, Lukas et al: "A Unifying Review of Deep and Shallow Anomaly Detection"; arxiv.org; Cornell University Library; 201 Olin Library Cornell University Ithaca; NY 14853; Sep. 24, 2020; pp. 1-8; XP081770427.

* cited by examiner

PHYSICS-INFORMED ANOMALY DETECTION IN FORMED METAL PARTS

TECHNICAL FIELD

The present disclosure relates to detection of defects in parts manufactured by metal forming processes, such as stamping. Embodiments of the disclosure specifically relate to methods and systems for automatically detecting defects in formed metal parts using machine learning techniques.

BACKGROUND

Manufacturing of metal parts in many applications may involve a forming process where the metal part is essentially formed through mechanical deformation without adding or removing material. An example of a forming process is stamping. Stamping is a process of placing flat sheet metal in either blank or coil form into a stamping press, where a tool and die surface forms the metal into a net shape. Metal stamping is used across many different industries, such as automotive, aerospace, medical etc. Specifically, the role of metal stamping can be crucial in the automotive industry.

Different stamping approaches and forming techniques have been utilized in automotive manufacturing, such as punching, blanking, embossing, bending, flanging and coining, among others. Automotive manufacturers often desire to have a precise pattern matching and alignment solutions for automotive stamping parts, including frame pieces (underbody, floor pans, door panels etc.), motors and engines. However, stamped products might end up with various types of defects where the sheet metal internal characteristics are not correct and/or where problems related to die and press machine parameters are present. Some common defects are splits/cracks, deep scratches, wrinkles etc.

Current press lines used in automotive stamping plants can manufacture a part, for example, in every 3-6 seconds depending on the part dimensions and size. The cycle time is much faster than a human can inspect. Therefore, a sampling-based inspection, by one or more human operators, is usually utilized in most manufacturing floors. However, due to the small size of certain defects and the large scale of the production, it can be difficult for human operators to capture every single defective part.

If defects in formed parts go unnoticed, there is a huge cost associated to the end-product manufacturer or supplier. The cost increases the further downstream in the manufacturing process the defects are discovered, for example on account on transportation, storage, labor, etc. associated with handling the defective part(s). Hence, there exists a need for a solution for automatically and reliably detecting defects in formed parts at an early stage in production.

SUMMARY

Briefly, aspects of the present disclosure provide a solution for automatically and reliably detecting defects in formed metal parts using a technique of physics-informed anomaly detection with machine learning.

A first aspect of the disclosure provides a computer-implemented method for detecting defects in a formed metal part. The method comprises locating one or more regions of interest in a synthetic image of a part manufactured by a forming process. The synthetic image is informed based on a physics-based simulation of material state resulting from the forming process. The one or more regions of interest are indicative of a higher risk of having a defect resulting from the forming process than other regions in the synthetic image. The method further comprises registering a set of training images comprising real images of actual manufactured parts with the synthetic image, and overlaying the one or more regions of interest on each of the training images to extract patches from the training images that correspond to high-risk regions. The method further comprises training a first anomaly detection model on the patches extracted from the training images, wherein the first anomaly detection model is executable by a processor to detect a defect in a formed metal part in a manufacturing line from an acquired image of the formed metal part by detecting an anomaly in a patch extracted from the acquired image that corresponds to a high-risk region.

Other aspects of the disclosure implement features of the above-described method in a computer program product and a system for inspecting a manufacturing line.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced. For clarity, some of the images herein are schematically represented as line drawings.

DETAILED DESCRIPTION

Figure 1:
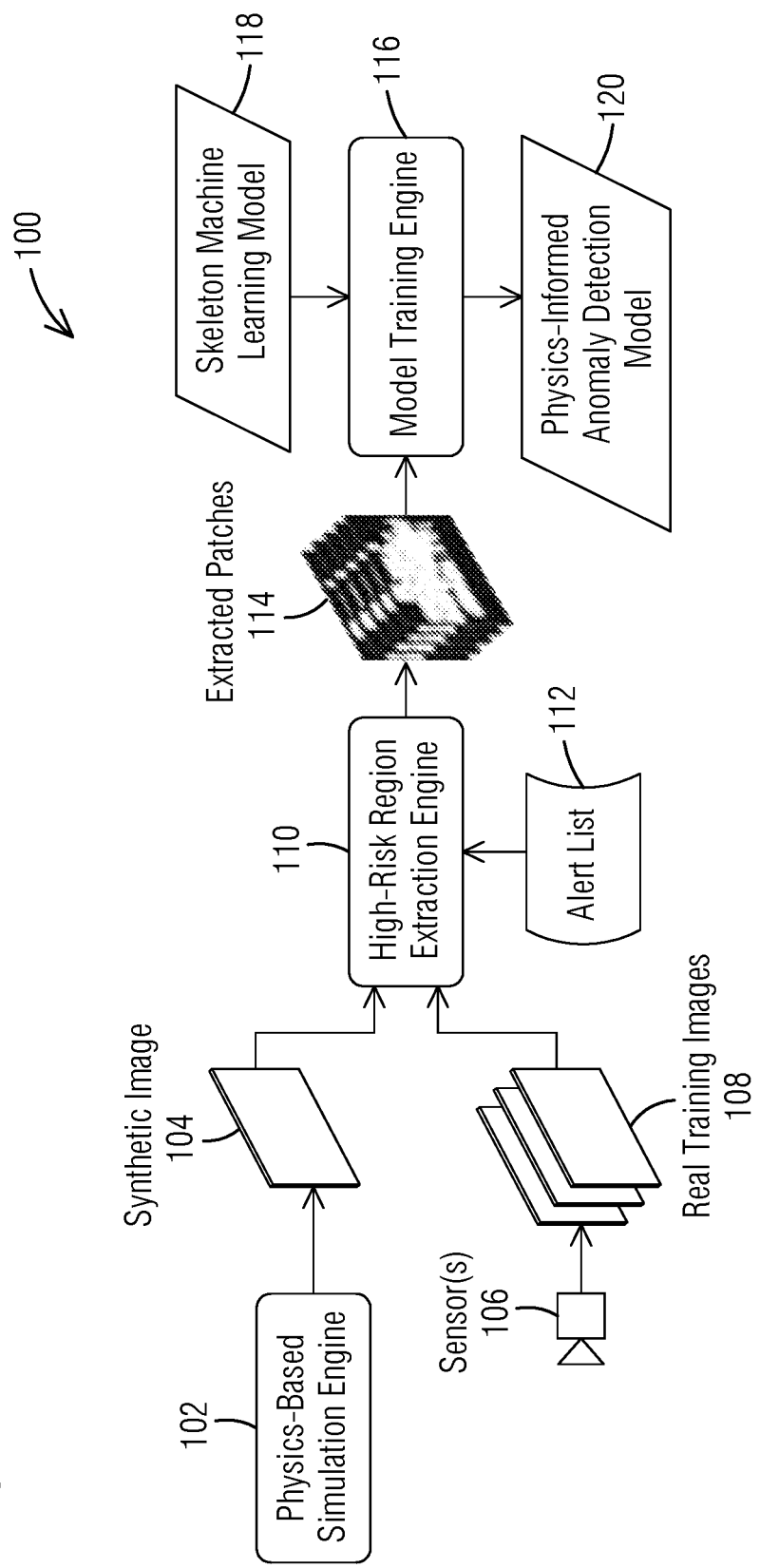
FIG. 1 is a schematic block diagram illustrating a system for training an anomaly detection model for detecting a defect in a formed metal part, according to an embodiment of the present disclosure.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

It is recognized that state-of-the-art manufacturing lines, such as press lines, operate on a large scale of production, leading to very low cycle times for human operators to effectively inspect formed metal parts for defects. Recent advancements in the field of artificial intelligence make it possible to employ deep learning models to tackle this challenge. For example, there exist software tools, such as In-Sight ViDi™ developed by Cognex Corporation, where an end user can train a deep learning model in a supervised manner if some labeled images are provided. However, it is recognized that such tools have not been practically used to inspect metal parts manufactured by stamping processes. Metal forming is a complex process, due to the part variety, complicated part structure, different defect types, low cycle times, etc., and hence cannot be solved by utilizing one camera and train a simple classification model. There has also been research where a deep learning model was specifically trained to detect a split in an automotive stamping application, for example as described in the publication: S. B. Block, R. D. da Silva, L. B. Dorini and R. Minetto, "Inspection of Imprint Defects in Stamped Metal Surfaces Using Deep Learning and Tracking," in IEEE Transactions on Industrial Electronics, vol. 68, no. 5, pp. 4498-4507, May 2021, doi: 10.1109/TIE.2020.2984453. However, such models can only be trained to recognize a specific type of defect (split or tear) and require a large amount of precisely labeled defective data (typically, more than 500 parts) for model training, in addition to requiring many high-resolution cameras. It is recognized that a fine-grained labelling requires much effort from the human operator. Furthermore, consistency of labeling is another important aspect, such as two operators can position and label the same defect differently.

Embodiments of the present disclosure provide solutions for automatically and reliably detecting defects in formed metal parts using a technique of physics-informed anomaly detection with deep learning.

The disclosed methodology provides an inventive pre-processing technique applied to the model training data that integrates physic-based simulations into the model training. The method aims to locate high-risk regions in a synthetic image of a formed metal part informed by physics-based simulations and overlay the high-risk regions on real training images of manufactured parts. Patches corresponding to the high-risk regions may be extracted from the real training images, which can be used to train a deep learning model to identify defects from an acquired image, focusing on the high-risk regions, making the model highly sensitive to identifying defects in expected areas of a formed metal part.

The disclosed methodology further uses the pre-processed training data obtained as described above to train a deep learning model for anomaly detection. In data science, "anomaly detection" refers to a process of identifying unexpected items or events in data sets, which differ from the norm. Anomaly detection is usually based on the assumptions that anomalies occur rarely in the data and that their features differ from the normal or "nominal" instances significantly. The trained deep learning model, herein referred to as a physics-informed anomaly detection model, is executable by a processor to detect a defect in a formed metal part in a manufacturing line from an acquired image of the formed metal part by detecting an anomaly in a patch extracted from the acquired image that corresponds to a high-risk region. In some embodiments, the disclosed method can obviate the need for "defective" data in the training process as the model training can be implemented using only nominal or defect-free data (which is abundantly available). The trained model can thereby detect any defect, such as split, crack, scratch, etc., without having to be trained with the knowledge of any specific type of defect.

Turning now to the drawings, FIG. 1 illustrates a system 100 for training an anomaly detection model for detecting a defect in a formed metal part according to an example embodiment. The various engines described herein, including the physics-based simulation engine 102, the high-risk region extraction engine 110 and the model training engine 116, including components thereof, may be implemented by a computing system in various ways, for example, as hardware and programming. The programming for the engines 102, 110, 116 may take the form of processor-executable instructions stored on non-transitory machine-readable storage mediums and the hardware for the engines may include processors to execute those instructions. The processing capability of the systems, devices, and engines described herein, including the physics-based simulation engine 102, the high-risk region extraction engine 110 and the model training engine 116 may be distributed among multiple system components, such as among multiple processors and memories, optionally including multiple distributed processing systems or cloud/network elements.

Continuing with reference to FIG. 1, the system 100 comprises a physics-based simulation engine 102 that can be utilized to generate a synthetic image 104 of a metal part manufactured by a forming process. The synthetic image 104 may be a physics-informed image that contains information pertaining to a material state resulting from the forming process, based on simulations carried out via the physics-based simulation engine 102. For example, the synthetic image 104 may comprise a color and/or intensity mapping of different regions of the part in the synthetic image 104 to a simulated strain level resulting from the forming process. The synthetic image 104 may thus represent a physical prior indicating which regions of the manufactured parts are more prone defects, such as splits, wrinkles, or scratches. In embodiments, the physics-based simulation engine 102 may include known software tools for generating the synthetic image 104.

For example, in one embodiment, the color and/or intensity mapping in the synthetic image may be based on a forming limit diagram (FLD) pertaining to a material of the part to be manufactured. A FLD analysis may be performed during the design of the part to be manufactured, as is commonly done in the automotive industry. As known to those skilled in the art, a FLD is used in sheet metal forming for predicting forming behavior of a sheet metal. The diagram attempts to provide a graphical description of material failure tests. By repeating the mechanical test to generate a range of stress states, the FLD can be generated as a line at which failure is onset.

Figure 2:
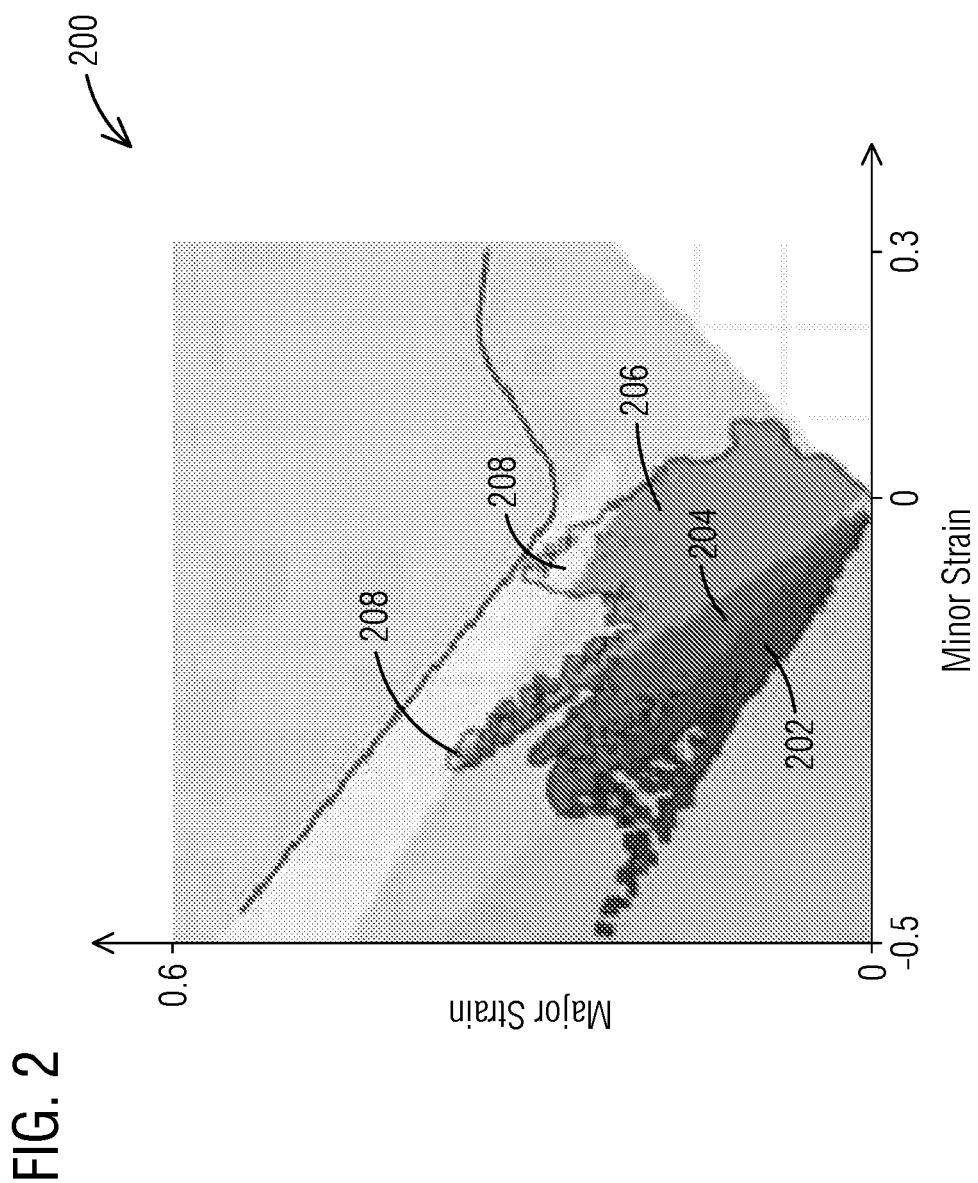
FIG. 2 illustrates an example of a forming limit diagram.

FIG. 2 illustrates one example of a known type of forming limit diagram 200. In the shown diagram, the y-axis represents major strain and the x-axis represents minor strain. The major strain is always defined as the higher of the principal strains and the minor strain is defined as the lower of the principal strains. The x and y coordinates together represent a strain state of the material. The illustrated FLD 200 defines multiple regions 202, 204, 206, 208 that represent different material states of a sheet metal subject to deformation by a forming process. For example, the region 202 indicates thickening, the region 204 indicates wrinkles, the region 206 indicates a well-stretched sheet (safe region) and the region 208 indicates a risk of developing splits. The underlying physics behind the definition of the regions 202, 204, 206, 208 are assumed to be understood by those skilled in the art and will not be described in any greater detail. The various regions in the FLD 200 may be visualized using different colors or grayscale intensities.

In one embodiment, the physics-based simulation engine 102 may utilize a finite element analysis (FEA) tool to simulate a physical response to a forming operation on a sheet metal of a specified material to produce a part having a specified geometry. The FEA tool may be used to generate a simulation output specifying a computed strain level for each element in a finite element mesh over a digitized geometric model (e.g., a CAD model) of the formed metal part. In one embodiment, the strain level for each element may be defined by a minor strain component and a major strain component.

Figure 3:
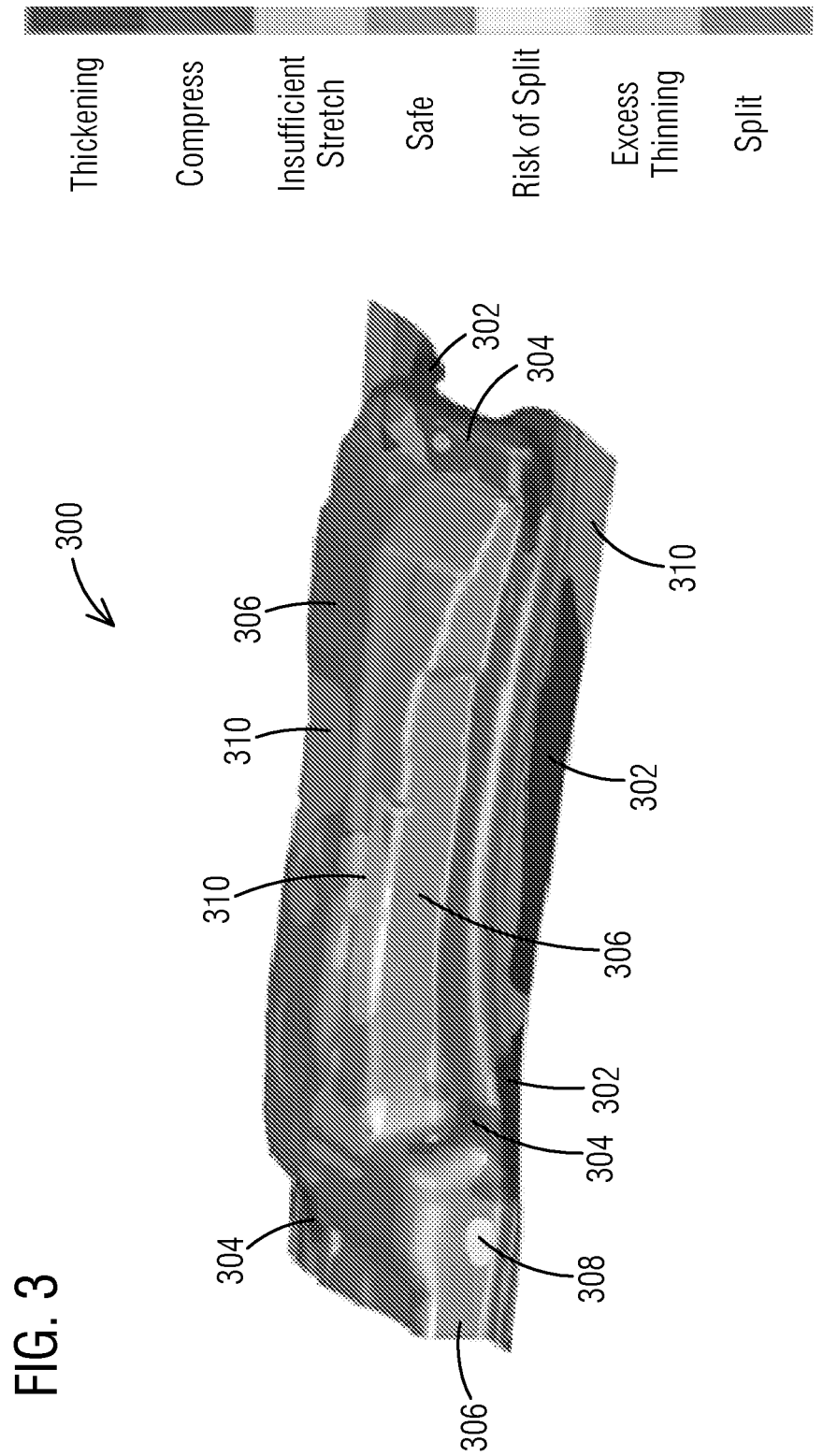
FIG. 3 illustrates an example of a synthetic image of a part manufactured by stamping, informed by a forming limit diagram.

The simulation output of the physics-based simulation engine 102 may be utilized to generate a 2-D synthetic image of the stamped metal part, as shown in FIG. 3. In one embodiment, the synthetic image may be generated based on a reference position or view of the part, which may, for example, correspond to the position/view of the part in a real image used for training and testing of a machine learning model. As shown, the synthetic image 300 may comprise a color or grayscale intensity mapping of various regions of the synthetic image 300 to the simulated strain level, the color or grayscale intensity mapping being based on the FLD 200. In the shown example, based on the simulated strain levels, the regions, 302, 304, 306 and 308 in the synthetic image 300 correspond to the regions 202, 204, 206 and 208 of the FLD 200. Thus, the synthetic image 300 is informed at least about the following information pertaining to material state by the FLD 200, namely: the region 302 is prone to thickening, the region 304 is prone to wrinkles, the region 306 is likely a safe region and the region 308 has a risk of developing splits. The region 310 of the image 300 indicates insufficient stretch and is also a likely safe region. Thus, the regions 302, 304, and 308 can be considered regions of interest (ROI) for having a higher risk of developing defects than regions 306 and 310.

Referring back to FIG. 1, the system 100 includes a high-risk region extraction engine 110 to extract high-risk regions from a set of real training images 108 of actual manufactured parts, which may be acquired via one or more shop floor sensors or cameras 106. In operation, the high-risk region extraction engine 110 is configured to locate or localize one or more ROIs in the synthetic image 104 (such as the ROIs 302, 304, 308 described above), for example, by determining bounding boxes around the ROIs, register the set of training images 108 with the synthetic image 104, and overlay the one or more ROIs on each of the training images 108 to extract patches from the training images 108 that correspond to high-risk regions. The term "patch", as used herein, refers to small, typically rectangular, piece of an image.

In one embodiment, locating the one or more ROIs in the synthetic image 104 may include suitably thresholding the synthetic image 104. For example, in the illustration shown in FIG. 3, the regions 302, 304, 306, 308 and 310 may have the respective colors, namely, purple, blue, green, yellow and gray. In this arbitrary example, a thresholding may be implemented in HSV (hue, saturation value) color space, where the gray and green regions (i.e., safe regions 310 and 306) are separatable from the rest of the image.

A next step may include segmentation of the synthetic image, for example, based on a binary segmentation mask, to determine contours of the one or more ROIs. The contours may be determined as a sequence of points (pixels) separating the one or more ROIs from the background in the synthetic image 104, for example, based on computer vision algorithms, deep learning-based visual perception algorithms, or other known techniques. Next, the one or more ROIs may be located or localized on the synthetic image 104 by determining a respective bounding box around each ROI, typically by determining coordinates of the x and y extremities of the determined contours.

In some embodiments, the high-risk region extraction engine 110 may execute morphological operations to eliminate any false ROIs caused by processing. Additionally, the high-risk region extraction engine 110 may extend an ROI in the synthetic image 104 to cover regions around the high-risk area to provide additional information, which can help with anomaly detection. Furthermore, the high-risk region extraction engine 110 may connect one or more smaller ROIs to a larger ROI in the synthetic image 104 to decrease the number of bounding boxes. This is because significant unbalances in bounding box sizes may cause the deep learning model to only focus on the larger ROIs and ignore the smaller ROI, which may cause the deep learning model to miss some small-sized defects. The above operation may also make visualization easier for an operator to locate a defective region.

The high-risk region extraction engine 110 may register the set of training images 108 to be aligned with the synthetic image 104 using any of several available techniques. Image registration generally refers to a process of geometrically aligning different images to a common coordinate system, for example, by determining an optimum geometric transformation to bring homologous points of two images as close as possible.

In one example embodiment, as disclosed herein, the high-risk region extraction engine 110 may be configured to implement a feature-based image registration process. Here, one of the training images 108 may be used as a reference real image. The reference real image may first be aligned with the synthetic image 104 based on matching (homologous) points, to compute a homogenous transformation matrix. The matching points may be determined based on features such as edges, holes or recesses, ridges, patterns, etc., which may be selected manually or automatically by the high-risk region extraction engine 110. The reference real image may be used to automatically align the remaining images in the set of training images 108 with the synthetic image 104. For example, in one embodiment, the high-risk region extraction engine 110 may automatically detect feature points using ORB (Oriented FAST and Rotated BRIEF) method in the reference real image and a new training image 108 and then match the detected feature points using a brute force nearest neighbor matcher. A registration transformation matrix can be computed based on the matching feature point pairs. Thereby, by registering each training image 108 with the reference real image, the respective training image 108 is also aligned or registered with the synthetic image 104. After registration, the bounding boxes on the synthetic image 104 (e.g., determined as described above) may be overlaid on each aligned training image 108 to extract the patches from the training images 108 corresponding to the high-risk regions.

Figure 4:
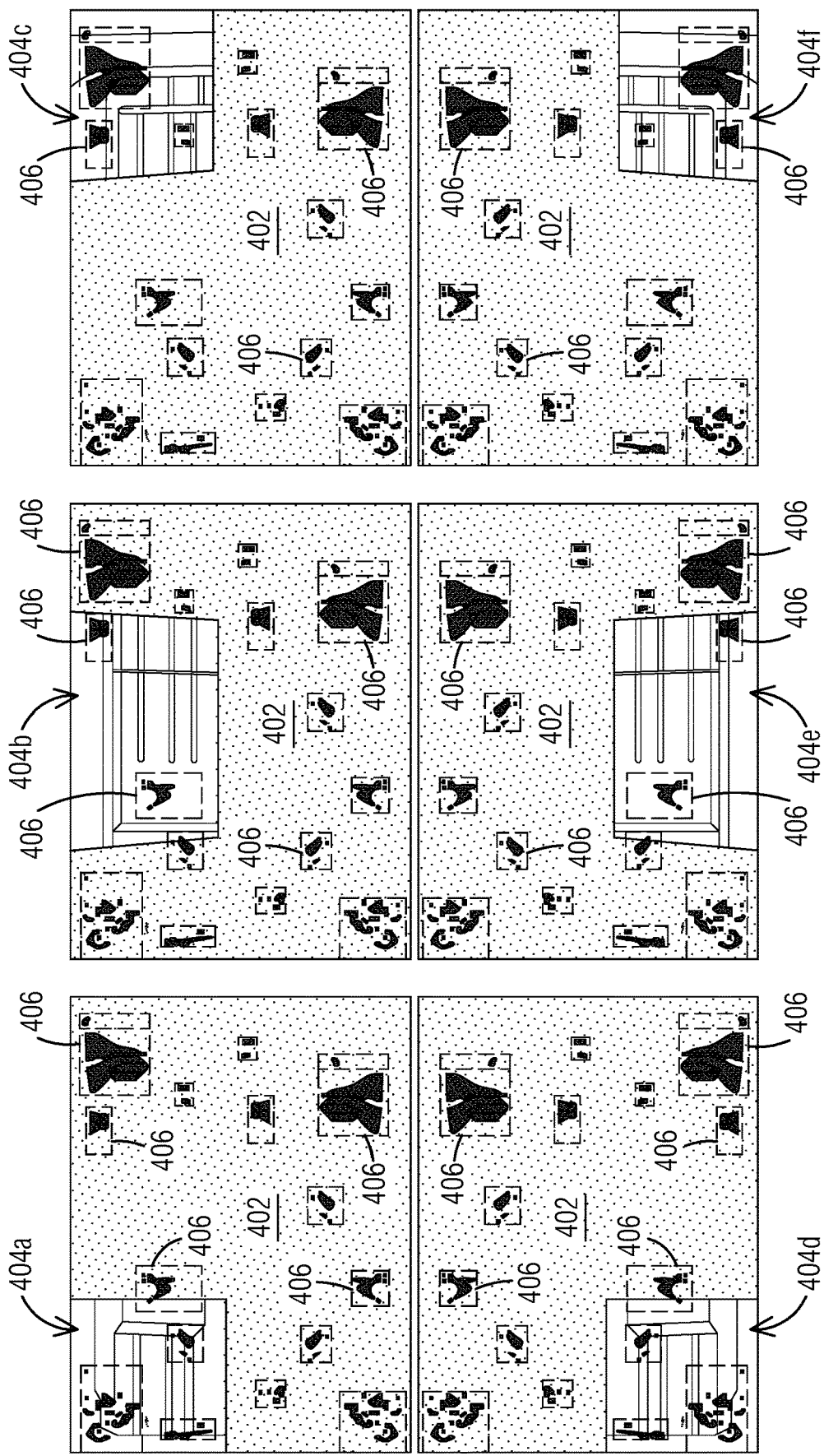
FIG. 4 illustrates an overlay of high-risk regions obtained from a physics-informed synthetic image on a real image of a manufactured part.

FIG. 4 shows an illustrative example depicting alignment of a real image of a large automotive part with a synthetic image 402. For clarity, the images herein are schematically represented as line drawings. In this example, due to the large size of the part, a total of six real images 404a, 404b, 404c, 404d, 404e, 404f are acquired to capture the whole part, while the synthetic image 402 includes a single high-resolution image. One way of accomplishing the image acquisition task may include mounting a movable array of sensors over the automotive part (3 sensors in this case) which can be triggered to capture images in two positions. In this example, images 404a-404c are captured when the sensor array is in a first position while images 404d-404f are captured when the sensor array has moved to a second position over the automotive part. In an alternate embodiment, the sensor array may be stationary while the part is movable on a conveyor belt relative to the sensor array. Still alternately, an array of six stationary sensors may be positioned to the capture different regions of the large part. As shown, each of the real images 404a-404f is aligned with the synthetic image 402, for example, based on a process of image registration as described above. Thus, each image 404a-404f is positioned at a respective location over the synthetic image 402 as determined by a respective registration transformation matrix. The synthetic image 402 includes bounding boxes 406 locating ROIs based on FLD analysis. As shown, respective bounding boxes 406 are overlaid on each aligned image 404a-404f to extract patches corresponding to high-risk regions. In an alternate approach, the images 404a-404f may be stitched into a single image of the entire part prior to alignment with the synthetic image 402 and overlay of the bounding boxes 406. The above-described process may be repeated for each image in the set of real training images 108.

Turning back to FIG. 1, optionally, the high-risk region extraction engine 110 may be provided with an alert list 112 by an operator, specifying one or more regions in addition to that obtained from the FLD analysis. The operator-specified regions of interest may be determined, for example, based on domain specific knowledge. The high-risk region extraction engine 110 may be configured to locate (e.g., using bounding boxes) and extract patches from the real training images 108 that correspond to those specified regions in addition to the FLD informed ROIs.

The system 100 further comprises a model training engine 116 for training a machine learning model 118 for anomaly detection using a training dataset comprising the extracted patches 114 from the set of real training images 108. The machine learning model 118 may typically comprise a deep learning model including one or more neural networks. For a neural network, an "anomaly" is usually defined as an out-of-normal-distribution sample. The deep learning model 118 may include a skeleton neural network (e.g., with unadjusted weights and biases). In one embodiment, the model training engine 116 may be configured to train the deep learning model 118 via an unsupervised deep learning process in which the set of training images 108 consist only of nominal images, i.e., real images of defect-free manufactured parts. This obviates the need for defective samples for training, which may be used for testing/validation of the trained model. The deep learning model 118 may thereby be trained to learn a distribution of normal data pertaining specifically to the extracted high-risk regions. In an alternate embodiment, the model training engine 116 may be configured to train the deep learning model 118 via a semi-supervised or supervised learning process.

In one suitable implementation, the deep learning model 118 may comprise an autoencoder, and desirably, an autoencoder having an extended architecture with custom layers and multi-loss functions. An autoencoder is an unsupervised artificial neural network that can learn how to efficiently compress and encode data and then reconstruct the data back from the reduced encoded representation to a representation that is as close to the original input as possible. Autoencoders can be used for image anomaly detection, for example, as described in the publication: Paul Bergmann, Michael Fauser, David Sattlegger, Carsten Steger; Proceedings of the IEEE/CVF Conference on Computer Vision and Pattern Recognition (CVPR), 2019, pp. 9592-9600.

The trained deep learning model, referred to herein as the physics-informed anomaly detection model 120, may be deployed to a computing system, such as an industrial computing device for inspecting a manufacturing line for defective parts. The physics-informed anomaly detection model 120 may be capable of detecting a variety of different types of defects without being explicitly trained on any specific type of defect, by detecting anomalies in certain high-risk regions of an image of a formed metal part. As illustrated referring to FIG. 5-6, the disclosed methodology requires the deployed physics-informed anomaly detection model 120 to process small portions or patches extracted from the acquired image of the formed metal part, making the model highly efficient and sensitive even to very small defects (e.g., less than 3 mm) in expected regions.

Figure 5:
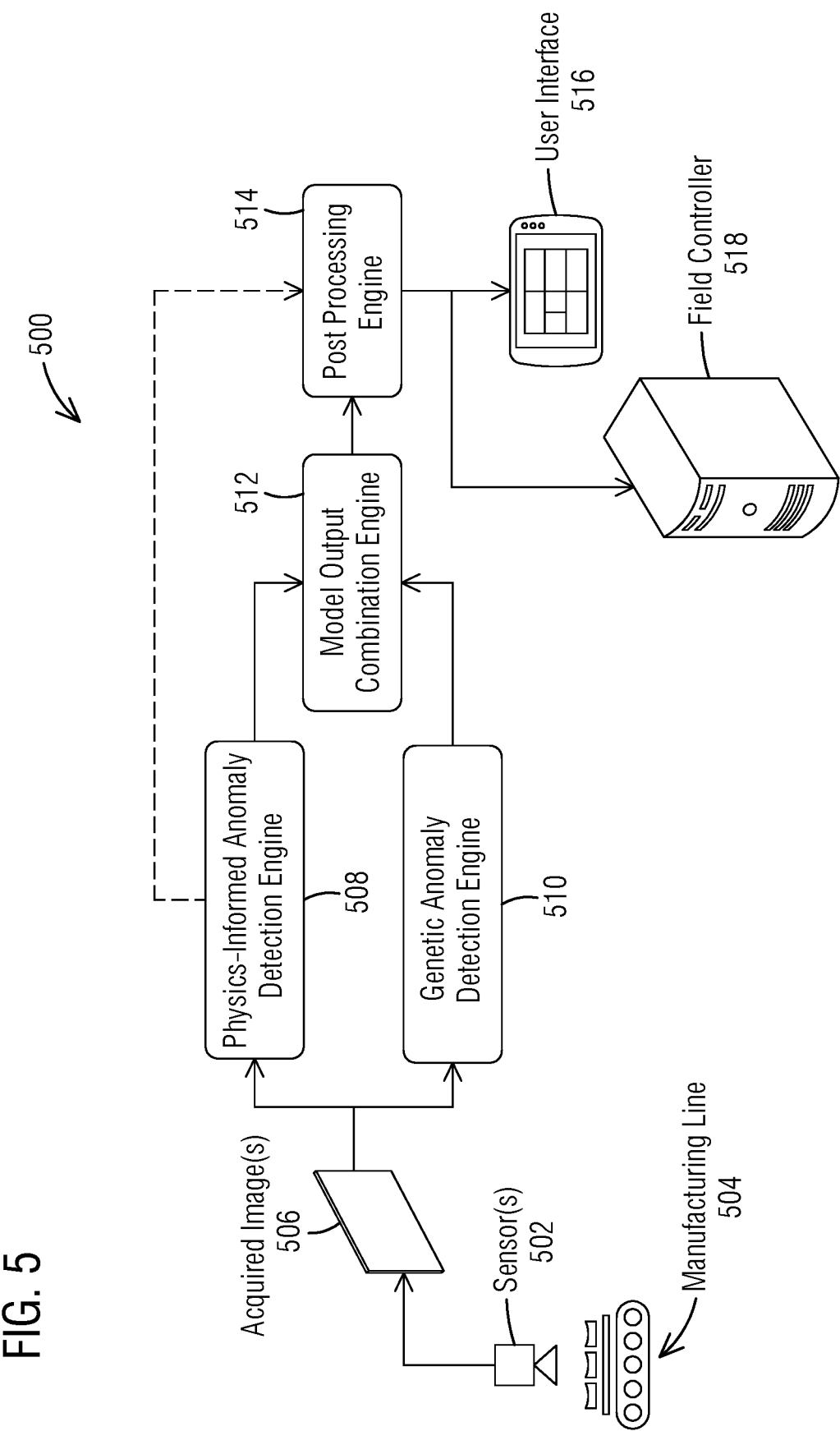
FIG. 5 is a schematic block diagram illustrating a system for inspecting a manufacturing line according to an exemplary embodiment of the disclosure.

FIG. 5 shows an exemplary embodiment of a system 500 for inspecting a manufacturing line. The various engines 508, 510, 512, 514 described herein, including components thereof, may be implemented by a computing system in various ways, for example, as hardware and programming. The programming for the engines 508, 510, 512, 514 may take the form of processor-executable instructions stored on non-transitory machine-readable storage mediums and the hardware for the engines may include processors to execute those instructions. An example of a computing system suitable for implementing the various engines is described below referring to FIG. 8. In one suitable implementation, such a computing system be provided with one or more deep learning processors such as neural processing units (NPU) to run the deployed deep learning models in a computationally efficient fashion.

Referring to FIG. 5, the system 500 may comprise at least one sensor 502 positioned to acquire images 506 of formed metal parts in a manufacturing line 504. The manufacturing line 504 may comprise a queue of formed metal parts positioned on a conveyor system. In one example, the manufacturing line 504 may be a press line for producing automotive parts by a stamping process. Depending on the size of the part, one or more sensors may be employed to capture one or more images of an individual part. For example, as described above, for large parts (e.g., an automotive floor panel), an array of sensors may be used to capture images of different regions of the part. The acquired image 506 for each individual part in the manufacturing line 504 may accordingly include a single image or a plurality of images.

During operation of the manufacturing line 504, the sensor(s) 502 may be used to acquire an image 506 for each individual part in the manufacturing line 504, which may be provided as an input to a physics-informed anomaly detection engine 508. The physics-informed anomaly detection engine 508 may utilize a trained deep learning model, such as the above-described physics-informed anomaly detection model 120, to extract one or more patches from the acquired image 506 that correspond to high-risk regions and detect an anomaly in the one or more patches to identify a defect in the formed metal part.

The physics-informed anomaly detection engine 508 may first register the acquired image 506 to be aligned with the synthetic image 104 to extract patches from the acquired image 506 corresponding to the high-risk regions, based on the one or more regions of interest in the synthetic image 104. In one embodiment, the registration process may utilize the pre-aligned reference real image that was used to register the set of training images 108. For each incoming image 506 acquired during operation of the manufacturing line 504, feature points may be automatically detected in the incoming image 506 (e.g., using ORB method) and matched with corresponding feature points on the reference real image. Thereby, by registering each acquired image 506 with the reference real image, the respective acquired image 506 is also aligned or registered with the synthetic image 104. After registration, the bounding boxes on the synthetic image 104 may be overlaid on the acquired image 506 to extract the patches corresponding to the high-risk regions. Again, the bounding boxes may be overlaid on a single acquired image of the entire part or on multiple acquired images corresponding to different regions of the part (for example, as described in FIG. 4), to extract the patches.

Figure 6:
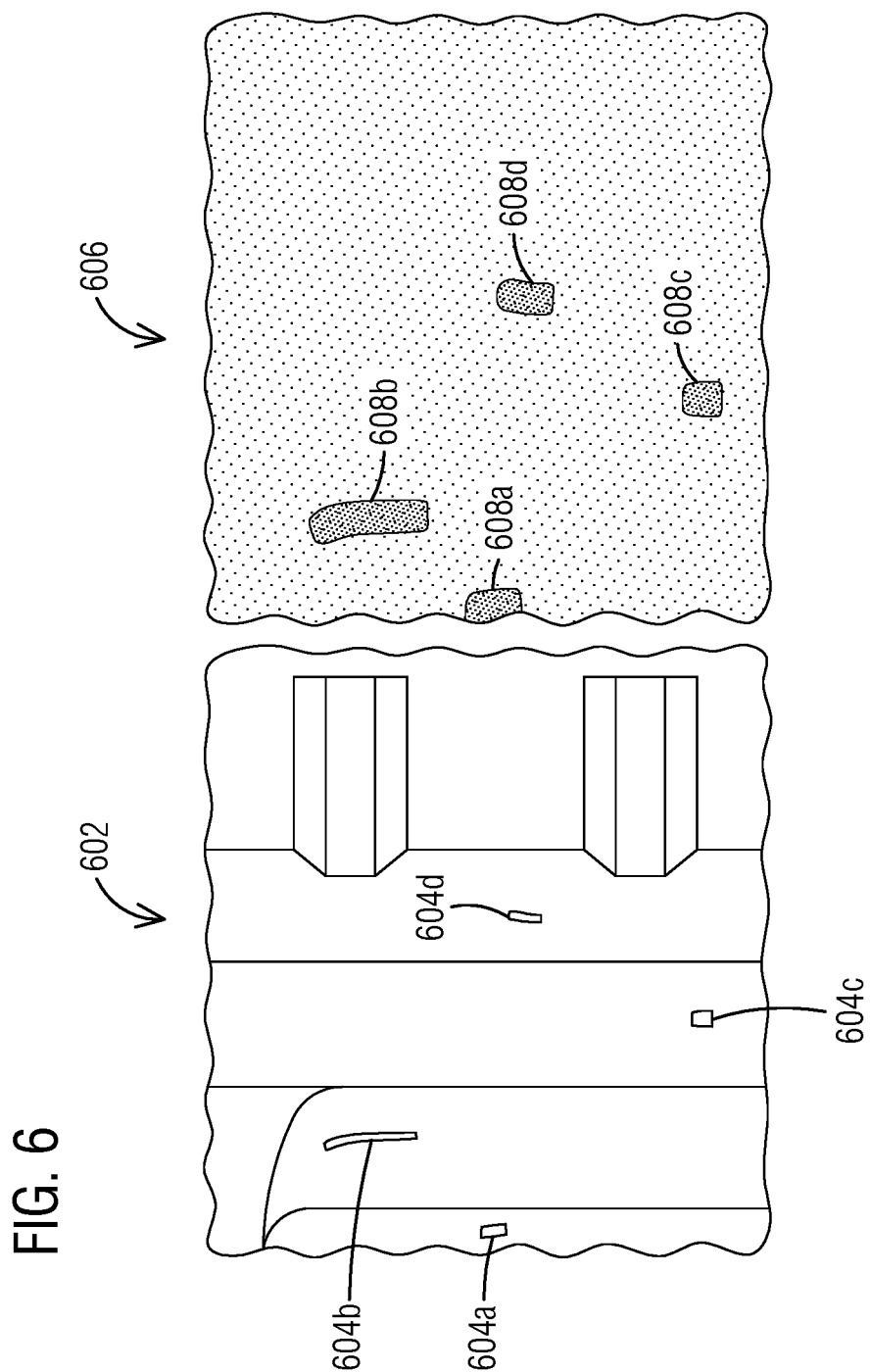
FIG. 6 illustrates generation of a loss map based on an extracted high-risk region from an acquired image by a physics-informed anomaly detection model.

As a next step, the physics-informed anomaly detection engine 508 may reconstruct a respective nominal image for each extracted patch of the acquired image 506. FIG. 6 shows an example of an extracted patch 602 that represents a small but high-risk region in an acquired image of a formed metal part. For clarity, the images herein are schematically represented as line drawings. As shown, the extracted patch 602 includes defects 604a, 604b, 604c, 604d. Since the deep learning model was trained to only learn distribution of normal data (without defects) pertaining to the extracted regions, any defects such as 604a, 604b, 604c, 604d appearing on the extracted patch 602 will not recognized by the model. The reconstructed nominal image would thereby exclude such defects as being out-of-normal-distribution. Defects in the acquired image 506 may be revealed by comparing each extracted patch of the acquired image (e.g., patch 602) to the respective reconstructed nominal image, to detect an anomaly.

In one embodiment, the physics-informed anomaly detection engine 508 may determine a pixel-wise location of a defect based on a loss map, which is defined by a difference between the extracted patch of the acquired image and the reconstructed nominal image. FIG. 6 shows an example of a loss map 606 corresponding to the extracted patch 602. According to an example technique, the loss map 606 may be generated by determining a pixel-wise anomaly score based on a reconstruction error between the extracted image patch 602 and the reconstructed nominal image corresponding to the patch 602, with higher scores representing more likely anomalies. Optionally, the residual map may be smoothed out by filtering. Subsequently, a binary segmentation may be carried out to identify the location of an anomaly. In the example shown in FIG. 6, the anomalies 608a, 608b, 608c, 608d in the loss map 606 indicate the location of the defects 604a, 604b, 604c, 604d respectively.

A post processing engine 514 may be used to draw bounding boxes around the determined locations of the defects on the actual acquired image 506 of the formed metal part (e.g., based on the loss maps). The identified defects relevant information, including the presence and location of the identified defects, can then be visualized and displayed to the operator via a user interface 516, such as an HMI device, among others.

In an exemplary embodiment, the system 500 may comprise a generic anomaly detection engine 510 in addition to a physics-informed anomaly detection engine 508, as shown in FIG. 5. While the physics-informed anomaly detection engine 508 can detect defects efficiently and with high sensitivity in regions of a formed metal part that have a high risk of developing defects, in rare instances, defects can randomly develop in other regions of the formed part. The generic anomaly detection engine 510 may utilize a separate deep learning model trained on entire images in the set of training images to detect randomly occurring defects on any portion of a formed metal part. In one embodiment, the deep learning model for generic anomaly detection may also be trained via an unsupervised deep learning process using only nominal real images of manufactured parts as training images, to learn a distribution of normal data pertaining to the entire image. While the generic anomaly detection engine 510 can detect defects on the whole part, it may not be nearly as sensitive as the physics-informed anomaly detection engine 508 in detecting defects in the high-risk regions. The combination of the physics-informed anomaly detection engine 508 and the generic anomaly detection engine 510 may thereby significantly improve the reliability and sensitivity of the system 500. Depending on the use-case, the physics-informed anomaly detection engine 508 may be employed either individually or in combination with the generic anomaly detection engine 510.

In the present embodiment, as shown in FIG. 5, the acquired image 506 of each individual part may be simultaneously provided as input to both, the generic anomaly detection engine 510 and the physics-informed anomaly detection engine 508. The generic anomaly detection engine 510 may reconstruct a nominal image corresponding to the entire acquired image 506 and compare the entire acquired image 506 to the reconstructed nominal image to detect an anomaly and locate a defect anywhere in the acquired image, for example, by generating a loss map as described above.

The system 500 may further comprise a model output combination engine 512 for combining outputs of the physics-informed anomaly detection engine 508 and the generic anomaly detection engine 510, to generate a common output indicating presence and location of one or more defects on the acquired image 506. The outputs of the two anomaly detection engines 508 and 510 may be combined in many ways. According to one embodiment, the loss maps output by the two anomaly detection engines 508 and 510 may be combined in a way such that, for overlapping regions of the acquired image that are processed by both the anomaly detection engines 508 and 510, a positive detection by the physics-informed anomaly detection engine 508 is prioritized. That is, the combined output would indicate presence of a defect at a location where only the physics-informed anomaly detection engine 508 reacted with a positive anomaly detection but the generic anomaly detection engine 510 did not react. The detected defects may also be assigned a confidence score based on the combined output of the anomaly detection engines 508 and 510 (e.g., a high score if both models react). For non-overlapping regions, the output of the generic anomaly detection engine 510 may be solely used to indicate the presence and location of a defect.

Figure 7:
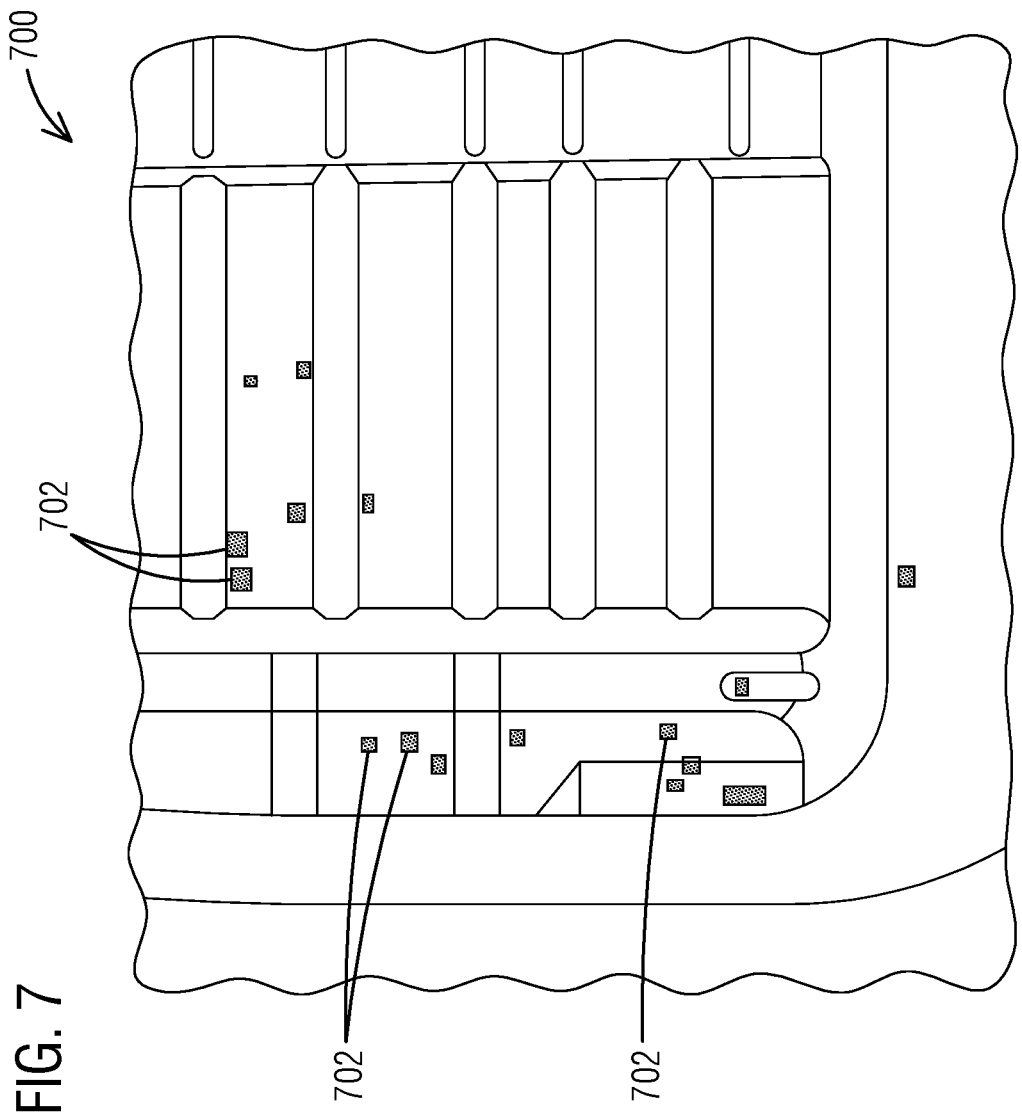
FIG. 7 illustrates an example technique for combining outputs of a physics-informed anomaly detection model and a generic anomaly detection model.

Based on the combined output, the post-processing engine 514 may be used to draw bounding boxes around the locations of the defects on the actual acquired image 506 of the formed metal part, as determined by the model output combination engine 512. The identified defects relevant information, including the presence and location of the identified defects, can then be visualized and displayed to the operator via a user interface 516, such as an HMI device, among others. FIG. 7 shows a visualization 700 of a combined output of the physics-informed anomaly detection engine 508 and the generic anomaly detection engine 510. For clarity, the images herein are schematically represented as line drawings. Herein, synthetically generated defects, as determined by the model output combination engine 512, are located by bounding boxes 702.

The disclosed embodiments thus provide a solution for automatically and reliably detecting defects in formed parts at an early stage in production. Based on the output of the anomaly detection engine(s), appropriate control action may be executed. Examples of control action may include isolating a defective part from production, shutting down production to avoid a catastrophic event (e.g., defects are detected in a succession of formed parts), and so on. The control action may be executed automatically, semi-automatically, or manually, responsive to the output of the anomaly detection engine(s), specifically, a positive defect detection in one or more formed metal parts in the manufacturing line 504. For example, in one embodiment, as shown in FIG. 5, the system 500 may include a field controller 518 for automatically executing a control action to control the manufacturing line 504 based on the output of the anomaly detection engine(s). In embodiments, the field controller 518 may comprise or be integrated with automation system equipment such as PLCs (Programmable Logic Controllers), drives, etc. for executing the control action.

Additionally, operators can correct or override the automatically determined defects detected by, e.g., drawing a bounding box to missing defects, or pass the false alarm samples. All those missing defects and false alarms data may be stored in record for updating the deep learning models.

Figure 8:
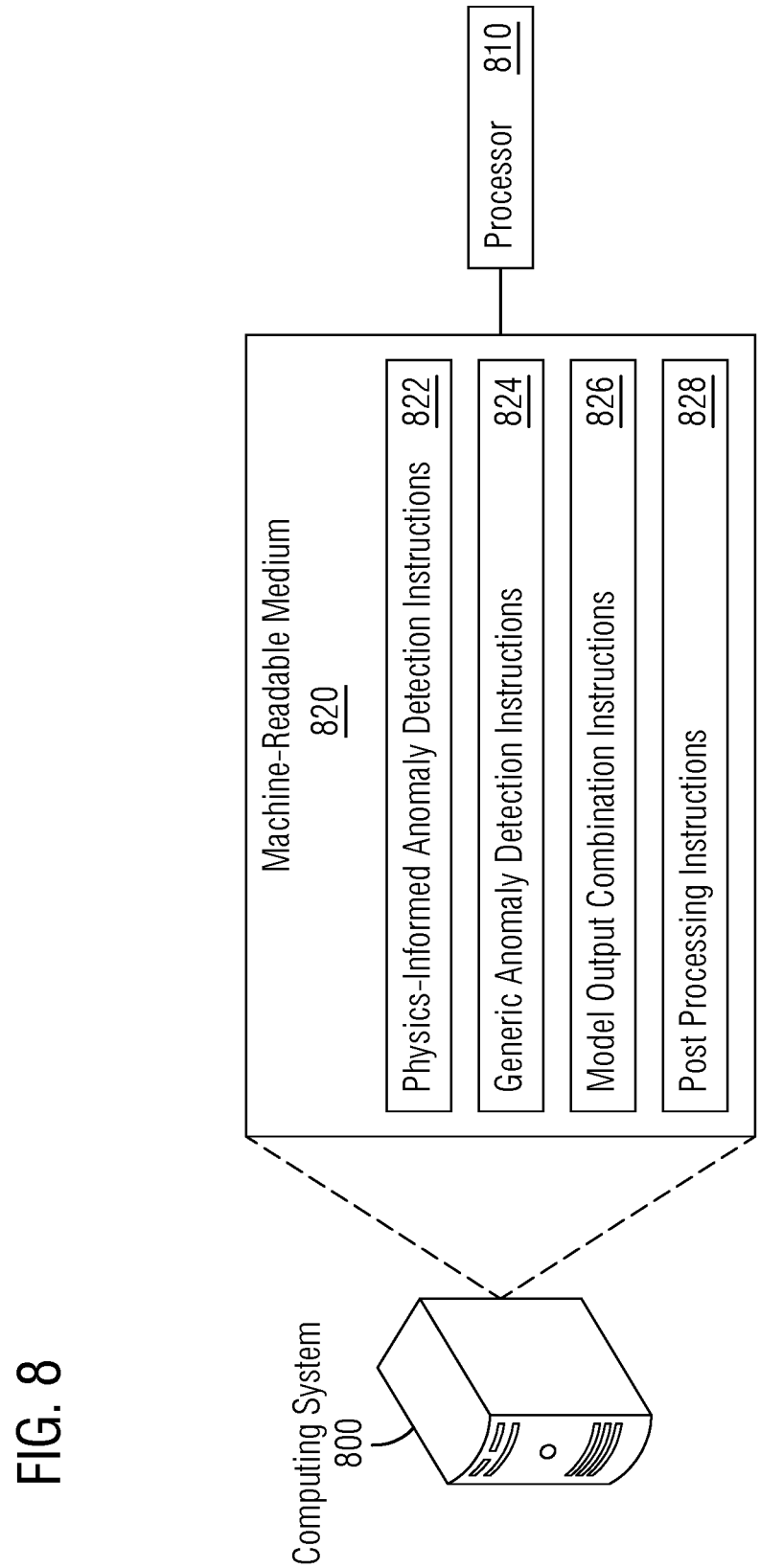
FIG. 8 illustrates a computing system that can support detection of a defect in a formed metal part in a manufacturing line according to disclosed embodiments.

FIG. 8 shows an example of a computing system 800 that can support detection of a defect in a formed metal part in a manufacturing line according to disclosed embodiments. In examples, the computing system 800 may be configured as an edge-enabled device. The computing system 800 includes at least one processor 810, which may take the form of a single or multiple processors. The processor(s) 810 may include a central processing unit (CPU), a graphics processing unit (GPU), a neural processing unit (NPU), a microprocessor, or any hardware device suitable for executing instructions stored on a memory comprising a machine-readable medium. The computing system 800 further includes a machine-readable medium 820. The machine-readable medium 820 may take the form of any non-transitory electronic, magnetic, optical, or other physical storage device that stores executable instructions, such as physics-informed anomaly detection instructions 822, generic anomaly detection instructions 824, model output combination instructions 826 and post processing instructions 828, as shown in FIG. 8. As such, the machine-readable medium 820 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 800 may execute instructions stored on the machine-readable medium 820 through the processor(s) 810. Executing the instructions (e.g., the physics-informed anomaly detection instructions 822, the generic anomaly detection instructions 824, the model output combination instructions 826 and the post processing instructions 828) may cause the computing system 800 to perform any of the technical features described herein, including according to any of the features of the physics-informed anomaly detection engine 508, the generic anomaly detection engine 510, the model output combination engine 512 and the post processing engine 514 described above.

The systems, methods, devices, and logic described above, including the physics-informed anomaly detection engine 508, the generic anomaly detection engine 510, the model output combination engine 512 and the post processing engine 514, may be implemented in many different ways in many different combinations of hardware, logic, circuitry, and executable instructions stored on a machine-readable medium. For example, these engines may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the physics-informed anomaly detection engine 508, the generic anomaly detection engine 510, the model output combination engine 512 and the post processing engine 514. Computer readable program instructions described herein can be downloaded to respective computing/processing devices from a computer readable storage medium or to an external computer or external storage device via a network, for example, the Internet, a local area network, a wide area network and/or a wireless network.

The processing capability of the systems, devices, and engines described herein, including the physics-informed anomaly detection engine 508, the generic anomaly detection engine 510, the model output combination engine 512 and the post processing engine 514 may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

The system and processes of the figures are not exclusive. Other systems, processes and menus may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

What is claimed is:

1. A computer-implemented method for detecting defects in a formed metal part, comprising:
   locating one or more regions of interest in a synthetic image of a part manufactured by a forming process, the synthetic image being informed based on a physics-based simulation of material state resulting from the forming process, the one or more regions of interest indicative of a higher risk of having a defect resulting from the forming process than other regions in the synthetic image, registering a set of training images comprising real images of actual manufactured parts with the synthetic image, and overlaying the one or more regions of interest on each of the training images to extract patches from the training images that correspond to high-risk regions, and training a first anomaly detection model on the patches extracted from the training images, wherein the first anomaly detection model is executable by a processor to detect a defect in a formed metal part in a manufacturing line from an acquired image of the formed metal part by detecting an anomaly in a patch extracted from the acquired image that corresponds to a high-risk region.

2. The method according to claim 1, wherein the synthetic image comprises a color and/or intensity mapping of different regions of the part in the synthetic image to a simulated strain level resulting from the forming process, the color and/or intensity mapping being based on a forming limit diagram pertaining to a material of the part.

3. The method according to claim 1, wherein locating the one or more regions of interest on the synthetic image comprises determining a bounding box for each region of interest, wherein the bounding boxes are overlaid on the training images to extract the patches from the training images corresponding to the high-risk regions.

4. The method according to claim 1, wherein the training of the first anomaly detection model comprises an unsupervised deep learning process in which the set of training images comprise only nominal real images of manufactured parts to train the first anomaly detection model to learn a distribution of normal data pertaining to the high-risk regions.

5. The method according to claim 1, comprising executing the first anomaly detection model by one or more processors for inspecting a manufacturing line, wherein executing the first anomaly detection model comprises:

acquiring an image of a formed metal part in the manufacturing line via one or more sensors, registering the acquired image with the synthetic image and extracting patches from the acquired image corresponding to high-risk regions based on the one or more regions of interest in the synthetic image, reconstructing a nominal image corresponding to each extracted patch of the acquired image, and comparing each extracted patch of the acquired image to the respective reconstructed nominal image to detect an anomaly.

6. The method according to claim 5, comprising determining a pixel-wise location of a defect based on a loss map between each extracted patch of the acquired image and the respective reconstructed nominal image.

7. The method according to claim 6, comprising visualizing the defect via a user interface by drawing a bounding box around the determined location of the defect on the acquired image of the formed metal part.

8. The method according to claim 5, further comprising executing a second anomaly detection model by the one or more processors for inspecting the manufacturing line, the second anomaly detection model being trained on entire images in the set of training images to detect randomly occurring defects on any portion of a formed metal part, wherein executing the second anomaly detection model comprises:

reconstructing a nominal image corresponding to the entire acquired image, and comparing the entire acquired image to the reconstructed nominal image to detect an anomaly and locate a defect.

9. The method according to claim 8, comprising combining outputs of the first and second anomaly detection models to generate a common output indicating presence and location of one or more defects on the acquired image and visualizing the common output via a user interface.

10. The method according to claim 9, wherein combining the outputs comprises prioritizing a positive detection by the first anomaly detection model in regions of the acquired image that are processed by both the first and second anomaly detection models.

11. The method according to claim 8, further comprising executing a control action to control the manufacturing line responsive to an output of the first anomaly detection model or based on a combined output of the first and second anomaly detection models.

12. A non-transitory computer-readable storage medium including instructions that, when processed by a computing system, configure the computing system to perform the method according to claim 1.

13. A system for inspecting a manufacturing line, comprising:

one or more sensors for discretely capturing images of formed metal parts in the manufacturing line, and computing system comprising:
  one or more processors,
  a memory storing algorithmic modules executable by the one or more processors, the algorithmic modules comprising:
    a physics-informed anomaly detection engine utilizing a first anomaly detection model trained by a method according to claim 1, the physics-informed anomaly detection engine configured to:
      acquire an image of a formed metal part in the manufacturing line via the one or more sensors,
      extract a patch from the acquired image that corresponds to a high-risk region, and
      detect an anomaly in the extracted patch to identify a defect in the formed metal part.

14. The system according to claim 13, wherein the algorithmic modules further comprise a generic anomaly detection engine utilizing a second anomaly detection model trained on entire images in the set of training images to detect randomly occurring defects on any portion of a formed metal part, wherein the generic anomaly detection engine is configured to compare the entirety of the acquired image to the entirety of the reconstructed nominal image to identify a defect in the formed metal part.

15. The system according to claim 14, wherein the algorithmic modules further comprise a model output combination engine to determine a presence and location of one or more defects on the acquired image of the formed metal part based on a combination of the physics-informed anomaly detection engine and the generic anomaly detection engine.

* * * * *